(12) United States Patent
Potgieter et al.

(10) Patent No.: US 9,375,694 B2
(45) Date of Patent: Jun. 28, 2016

(54) DEVICE WITH DILATED OXIDATION ZONE FOR GASIFYING FEEDSTOCK

(71) Applicant: PHG Energy, LLC, LaVergne, TN (US)

(72) Inventors: Deon John Potgieter, Monroe, LA (US); Billy Freeman Hopper, Carrollton, MS (US); Jeffrey Scott Brown, Leland, MS (US); Mark Oliver Loftin, Mobile, AL (US)

(73) Assignee: PHG ENERGY, LLC, Antioch, TN (US)

( * ) Notice: Subject to any disclaimer, the term of this patent is extended or adjusted under 35 U.S.C. 154(b) by 167 days.

(21) Appl. No.: 14/222,217

(22) Filed: Mar. 21, 2014

(65) Prior Publication Data

US 2014/0219874 A1 Aug. 7, 2014

Related U.S. Application Data

(63) Continuation of application No. 13/751,983, filed on Jan. 28, 2013, now Pat. No. 8,721,748.

(51) Int. Cl.
| | |
|---|---|
| *B01J 7/00* | (2006.01) |
| *B01J 6/00* | (2006.01) |
| *C10J 3/26* | (2006.01) |
| *C10J 3/42* | (2006.01) |

(Continued)

(52) U.S. Cl.
CPC .. *B01J 6/008* (2013.01); *C10J 3/26* (2013.01); *C10J 3/42* (2013.01); *C10J 3/723* (2013.01); *C10J 3/726* (2013.01); *C10J 3/74* (2013.01); *C10J 2200/156* (2013.01); *C10J 2300/092* (2013.01); *C10J 2300/0916* (2013.01); *C10J 2300/0956* (2013.01); *C10J 2300/1846* (2013.01)

(58) Field of Classification Search
CPC .. C10J 3/26; C10J 2300/0956; C10J 2200/09; C10J 2300/0959; C10J 3/34; C10J 3/36; C10J 3/42; C10J 2200/152; C10J 3/40
See application file for complete search history.

(56) References Cited

U.S. PATENT DOCUMENTS

| | | | |
|---|---|---|---|
| 2,281,562 | A | 5/1942 | Ditto et al. |
| 2,516,141 | A | 7/1950 | Newman et al. |

(Continued)

FOREIGN PATENT DOCUMENTS

| | | |
|---|---|---|
| CN | 2677376 Y | 2/2005 |
| WO | WO-03040267 | 5/2003 |

(Continued)

OTHER PUBLICATIONS

Kumar, et al., Modeling and Simulation of Down Draft Gasifier, Journal of Applied Sciences, 8: 271-279, 2008.

(Continued)

*Primary Examiner* — Imran Akram
(74) *Attorney, Agent, or Firm* — Kelly J. Hollowell; Stites & Harbison PLLC

(57) ABSTRACT

A downdraft gasifier that utilizes a plurality of vertically positioned tubes to create a pyrolysis zone, an oxidation zone beneath the pyrolysis zone and a reduction zone beneath the oxidation zone. The shape of the tubes eliminates the need for a restriction (hearth), which limits the maximum achievable throughput. A rotating and vertically adjustable grate is located beneath, but not attached to, the reduction zone of the gasifier.

24 Claims, 8 Drawing Sheets

(51) Int. Cl.
  *C10J 3/72* (2006.01)
  *C10J 3/74* (2006.01)

(56) References Cited

U.S. PATENT DOCUMENTS

| | | | | |
|---|---|---|---|---|
| 4,004,895 A * | 1/1977 | Gold | ............... | C01B 3/061 48/101 |
| 4,146,369 A * | 3/1979 | Flesch | ............... | C01J 3/54 252/373 |
| 4,764,185 A | 8/1988 | Mayer | | |
| 5,425,791 A | 6/1995 | Tanca | | |
| 6,112,677 A | 9/2000 | Kuntschar et al. | | |
| 2005/0155288 A1 * | 7/2005 | Rogers | ............... | C10J 3/26 48/197 FM |
| 2006/0265954 A1 | 11/2006 | Dogru et al. | | |
| 2009/0119993 A1 | 5/2009 | Neves et al. | | |
| 2011/0078951 A1 | 4/2011 | Blasiak et al. | | |
| 2012/0036777 A1 | 2/2012 | Patel | | |
| 2012/0171084 A1 * | 7/2012 | Kuske | ............... | C10J 3/526 422/187 |
| 2012/0210645 A1 * | 8/2012 | Rutberg | ............... | C10J 3/24 48/87 |
| 2014/0151603 A1 * | 6/2014 | Anderson | ............... | C10J 3/482 252/373 |

FOREIGN PATENT DOCUMENTS

| | | |
|---|---|---|
| WO | WO-2008068596 | 6/2008 |
| WO | WO-2009009693 | 1/2009 |
| WO | WO-2009100487 | 8/2009 |
| WO | WO-2010064222 | 4/2010 |
| WO | WO-2011115770 | 9/2011 |

OTHER PUBLICATIONS

Gaseous Fuel Production: www.emispec.ca/en/gaseous-fuel-production.php.
Hybrid VAM and Coal Waste Fired Power Generation: www.metts.com.au/hybrid-vam-and-coal-waste-fired-power-generation.html.
Biomass: www.springvale.biz/course%20notes/week11%20Biomass%20wood%20combustion1/week11.htm.
What is Gasification: http://ankurscientific.com/whatisgasification.htm.
My Home-Made Biomass Gasifier: www.mdpub.com/gasifier/index.html.
Ganesh, Biomass Energy for Rural Electrification: An Analysis of Small Scale Implementation, Department of Electrical and Computer Engineering, Calgary, Sep. 2006.
Gasification: www.thompsonspaven.com/acatalog/gasification.html.
Waste Gasification: www.wastesyn.com/tech_wg.html.

* cited by examiner

DEVICE WITH DILATED OXIDATION ZONE FOR GASIFYING FEEDSTOCK

CROSS REFERENCE TO RELATED APPLICATION

The present application is a continuation of U.S. application Ser. No. 13/751,983, filed Jan. 28, 2013 and titled Device with Dilated Oxidation Zone for Gasifying Feedstock, which is herein incorporated by reference in its entirety.

The invention relates to thermochemical technology and equipment, in particular, to processes and apparatuses for gasifying solid biomass, household and industrial waste, fossil fuels as well as other carbon-containing feedstock using downdraft gasification.

BACKGROUND

Gasification is a continuous thermal decomposition process in which solid organic or carbonaceous materials (feedstock) break down into a combustible gas mixture. The combustible gas components formed are primarily carbon monoxide (CO), hydrogen ($H_2$), and methane ($CH_4$). Other non-combustible gases such as nitrogen ($N_2$), steam ($H_2O$), and carbon dioxide ($CO_2$) are also present in various quantities. The process of gasification involves pyrolysis followed by partial oxidation, which is controlled by injecting air or other oxygen containing gases into the partially pyrolysed feedstock. More specifically, biomass gasification is a sequence of reactions including water evaporation, lignin decomposition, cellulosic deflagration and carbon reduction. An external heat source begins the reaction, but partial oxidation provides heat to maintain the thermal decomposition of the feedstock. If concentrated oxygen is used, the resulting gas mixture is called syngas. If air (which includes nitrogen) is used as the oxidant, the resulting gas mixture is called producer gas. For simplicity, the term "Producer Gas" as used herein shall include both syngas and producer gas. Both gas mixtures are considered a "fuel gas" and can be used as a replacement for natural gas in many processes. They can also be used as a precursor to generate various industrial chemicals and motor fuels. When biomass is used as the feedstock, gasification and combustion of the Producer Gas is considered to be a source of renewable energy.

As a general matter, gasification offers a more efficient, cost effective and environmentally friendly alternative for extracting potential energy from solid feedstock as compared to combustion. As a result of gasification, the feedstock's potential energy can be converted to Producer Gas, which is cleaner burning, compressible and more portable. Producer Gas may be burned directly in some engines and burners, purified to produce methanol and hydrogen, or converted via the Fischer-Tropsch and other methods and processes into synthetic liquid fuel.

There are three common gasification processes: fluidized bed gasification, updraft gasification and downdraft gasification. The present invention is an improved downdraft gasifier. Therefore only a brief description of fluidized bed gasification and updraft gasification are provided and followed by a fuller discussion of current downdraft gasification.

Updraft Gasification

The counter-current fixed bed ("updraft") gasifier consists of a fixed bed of feedstock on top of a large grate through which steam, oxygen and/or air flow upward. Updraft gasifiers typically require feedstock that is hardy and not prone to caking or clumping so that it will form a permeable bed. The updraft gasifier consists of a feedstock bed through which the oxidant (steam, oxygen and/or air) flows in from the bottom and exits through the top as gas. Updraft gasifiers are thermally efficient because the ascending gases pyrolyze and dry the incoming biomass, transferring heat so that the exiting Producer Gas is cooled when it exits the gasifier. However, significant amounts of tar are present in the Producer Gas, so it must be extensively cleaned before use, unless it is combusted at the point of generation. The tar can be recycled to the gasifier, but tar removal is complicated and costly. The updraft gasifier has been the standard of coal gasification for 150 years and it is also popular in biomass cooking stoves.

Fluidized-Bed Gasification

In a fluidized-bed gasifier, oxidant is blown through a bed of solid particles at a sufficient velocity to keep the solid particles in a state of suspension. The feedstock is introduced to the gasifier, very quickly mixed with the bed material and almost instantaneously heated to the bed temperature either externally or using a heat transfer medium. Most of these fluidized-bed gasifiers are equipped with an internal cyclone in order to minimize char (carried over into the Producer Gas stream) and remove fluidizing media from the Producer Gas. The major advantages include feedstock flexibility and the ability to easily control the reaction temperature, which allows for gasification of fine grained materials (sawdust, etc.) without the need of pre-processing. Fluidized-bed gasifiers also scale very well to large sizes. Unfortunately, problems with feeding, instability of the bed, build-up of residual carbon and ash sintering in the gas channels occur. Other drawbacks include high tar content of the Producer Gas (up to 500 mg/$m^3$ gas), relatively low efficiency and poor response to load changes. Due to high operating and maintenance costs, this style of gasification is economically limited to large-scale applications, typically in excess of 100 tons per day.

Downdraft Gasification

In downdraft gasification, all feedstock, air and gases flow in the same direction—from top to bottom. Although updraft gasification is typically favored for processing of biomass feedstock and fluid bed gasification is typically used in gasification of coal, downdraft gasification process has a number of advantages. One advantage of downdraft gasification is low levels of tar in the resulting Producer Gas because the tars generated during pyrolysis must pass through the Oxidation Zone (defined below) and the char bed in the Reduction Zone (defined below) before exiting the gasifier. The high temperature of the Oxidation Zone and the top of the char bed breaks down the tars (i.e., thermal cracking) The result is a Producer Gas that may be cooled and more easily cleaned for use in reciprocating engines, gas-fired turbines and catalytic reforming processes.

Current downdraft gasification processes have some significant disadvantages that have prevented widespread adoption. These disadvantages are: (1) the feedstock generally must be pre-processed into standard sizes with similar chemical properties (without mixing different types of feedstock or different size pieces) to enable continuous gasification without bridging (i.e., jamming) the device or disrupting the quality of the Producer Gas; (2) the feedstock must have a standardized range of volatile components; (3) the feedstock must have a standardized calorific content (i.e., btu/lb); (4) generally, the gasifier must be stopped frequently for cleaning and removal of excess char that accumulates at the bottom of the gasifier; (5) the Producer Gas created is of inconsistent quality, and the gasifier is less productive and less efficient due to temperature changes caused by frequent shutdowns and variations in feedstock; (6) the gasifiers do not allow for reconfiguration during operation and must be shut down every time the oxidation reaction shifts from its designated location in the gasifier; (7) the gasifiers are not thermally stable over long periods of time and lose efficiency (or melt down); and (8) the gasifiers do not allow the location of the oxidation reaction to be moved in tandem with the reduction zone to compensate for different conditions required to gasify different types of feedstock and to generate different ratios of Producer Gas components. But the most significant disadvantage of current downdraft gasifiers is that (9) they require hearth loading such that the Oxidation Zone, also the hottest zone of the gasifier, be designed with a substantial restriction point (i.e., a restriction of approximately one half the diameter of the other sections of the gasifier).

In an ideal downdraft gasifier, there are three zones: a Pyrolysis Zone, an Oxidation Zone and a Reduction Zone (each defined below). In such an ideal gasifier, (1) the residence time of feedstock could be controlled in the Oxidation Zone (relative to the flow of feedstock through the rest of the gasifier) to allow the maximum amount of feedstock to undergo gasification before passing out of the Oxidation Zone into the Reduction Zone and (2) the Reduction Zone would be designed to cause the hot gas produced in the Oxidation Zone to mix with the char in the Reduction Zone as quickly and as thoroughly as possible to promote thorough gasification. Unfortunately, the restriction area in current gasifiers greatly impedes the overall volume of feedstock that can be moved through such a gasifier and disrupts the overall flow and output of Producer Gas.

The restriction areas found in prior art gasifiers are commonly referred to as the throat and hearth, which are an intentional design in current downdraft gasifiers as dictated by the prevailing theory, Superficial Velocity Theory.

Superficial Velocity (SV) is measured as:

$$SV = \text{Gas Production Rate/Cross Sectional Area} = (m^3/s)/(m^2) = m/s$$

where s=time and m=distance.

Superficial Velocity Theory, when used to design downdraft gasifiers, dictates that a higher superficial gas velocity in the Oxidation Zone means a cleaner Producer Gas and less char by-product will be produced.

The physical restriction required by Superficial Velocity Theory in the Oxidation Zone itself limits both the entry and exit of feedstock in traditional downdraft gasifiers. It would be preferable to control the feedstock's velocity in the restriction area independent of its velocity throughout the rest of the gasifier in order to promote complete gasification and to reduce production of char by-product.

What is needed is a downdraft gasifier design that allows the flow rate of feedstock to be controlled as it passes through the Oxidation Zone with minimal restriction in order to improve the overall volume and flow of feedstock passing through the gasifier.

SUMMARY

The following is a summary description of the invention. It is provided as a preface to assist those skilled in the art to more rapidly assimilate the detailed discussion, which ensues and is not intended in any way to limit the scope of the claims, which are appended hereto, in order to particularly point out the invention.

The invention disclosed is a gasifier comprising a plurality of conjoined and vertically positioned tubes. The tubes have an interior wall and exterior wall and a proximal and distal end wherein the proximal end provides an inlet and the distal end provides an outlet. The gasifier has three separate reaction zones: (1) a Pyrolysis Zone; (2) an Oxidation Zone beneath the Pyrolysis Zone; and (3) a Reduction Zone beneath the Oxidation Zone. A rotating and vertically adjustable grate is located below, but not attached to, the Reduction Zone. Unlike other gasifiers, this is a partially open core gasifier without an airtight seal on the distal end of the gasifier.

Optionally, a Drying Zone is placed above the Pyrolysis Zone so the heat of the gasifier can be used to dry feedstock before it enters the gasifier. In operation, feedstock is fed into the Pyrolysis Zone (either directly or by way of the Drying Zone). Gravity causes the feedstock to move downward through the three reaction zones, with the Producer Gas and carbon ash and residue by-product formed after a biomass feedstock has been gasified ("Biochar") exiting through the grate at the bottom of the gasifier into collection chutes. The Biochar is separated from the Producer Gas by gravity.

The Producer Gas also exits through the grate and is collected by collection vents on the sides of the collection chutes. The pressure within the collection chutes is a function of pipelines connected to the gas collection vents and machinery attached to those pipelines downstream of the gasifier (i.e., engines, collection chambers, etc.) The pressure of the gasifier is not dependent on the pressure of the collection chutes.

DETAILED DESCRIPTION

Definitions

Figures 1, 2:
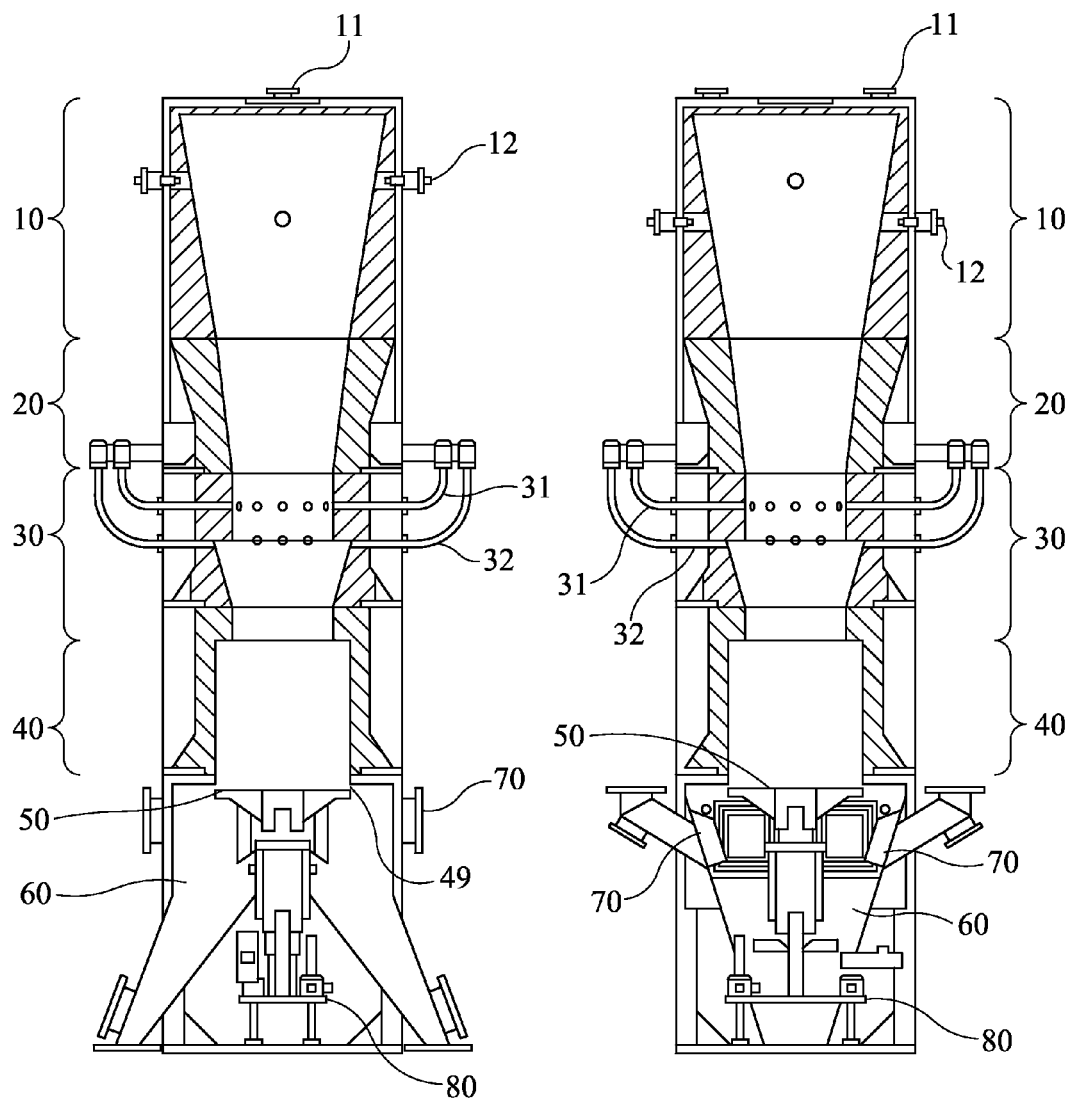
FIG. 1 shows a cutaway front view of a gasifier.
FIG. 2 shows a cutaway side view of a gasifier.

The following list of defined terms is in not intended to be limiting or comprehensive but merely provide a quick reference tool for understanding the invention. Other defined terms are capitalized in other sections of this document where they are used. Capitalized terms, shall include all variants, singular and/or plural versions of the terms used herein.

"Bed Oxidant Stream" or "Bed Air" means the Oxidant Stream entering the gasifier through inlets (i.e., non Plano Air Inlets) positioned at the top of the Pyrolysis Zone (or the optional Drying Zone).

"Biochar" means the carbon ash and residue by-product formed after a biomass feedstock has been gasified.

"Bypass" means the "gap" between the top of the grate located underneath the gasifier and the opening at the bottom of the Reduction Zone, which may also be referred to as the grate pitch.

"Control System" means an operating system, which includes multiple control mechanisms and coordinated software for a user/operator to adjust variables of a gasifier such as grate rotation and height, input of feedstock and Oxidant Streams.

"Drying Zone", with regard to the gasifier, means an area where feedstock is dried prior to entering a Pyrolysis Zone, said Drying Zone being a container of sorts or extension of the gasifier above the Pyrolysis Zone, but alternatively it may be an area and/or component/unit separate from the gasifier. In the context of the gasification process, the "Drying Zone" means the phase where feedstock is dried.

"Gasifier Flow Lane" means the path, generally toward the middle of a gasifier, where feedstock moves the fastest, is gasified, and the resulting Producer Gas and Biochar continue to move into a Reduction Zone and out of gasifier through a grate.

"Oxidant Stream" means air or other oxygen containing gases.

"Oxidation Band", with regard to a gasifier, means the location where the primary gasification reaction occurs. The Oxidation Band is where the Oxidant Streams converge and, together with the heat from the gasifier and the presence of feedstock, the gasifier quickly oxidizes the feedstock in a narrow band of white hot gas that extends across the diameter of a gasifier. In the context of the gasification process, the "Oxidation Band" means the hottest phase of the gasification reaction.

"Oxidation Zone", with regard to the gasifier, means a zone of a gasifier leading up to and away from an Oxidation Band. The overall shape of the Oxidation Zone is of a hollow tube, the tube having an inlet and an outlet of approximately the same size but is dilated in the middle. In the context of the gasification process, the "Oxidation Zone" means a phase where feedstock changes to a gas.

"Plano Air Inlets" means pressurized air inlets used to inject pressurized Oxidant Streams into a gasifier. In existing gasifiers, tuyeres are used to allow air to passively enter a gasifier, but Plano Air Inlets are instead pressurized to inject Oxidant Streams into the gasifier.

"Plano Oxidant Stream" or "Plano Air" means an Oxidant Stream entering a gasifier through Plano Air Inlets.

"Pressure Lock" means a pressure lock assembly with a valve at its top and another valve at its bottom, the pressure lock being located at the top of a gasifier.

"Pressure Wave" means the differential pressure between the center of the Oxidation Band and the Oxidation Zone wall, which pushes feedstock toward the wall of a gasifier forming an induced gradient of feedstock above the Oxidation Band ("Induced Feedstock Gradient") and an entrained gradient of Biochar below the Oxidation band ("Entrained Biochar Gradient").

"Producer Gas" means the combustible gas mixture created by gasification of feedstock and includes both syngas and producer gas.

"Purge Oxidant Stream" or "Purge Air" means the Oxidant Stream mixed with feedstock prior to the feedstock entering the Pyrolysis Zone (or the optional Drying Zone).

"Pyrolysis Zone", with regard to a gasifier, means the zone of the gasifier where the feedstock begins to fluidize and decompose before passing into the Oxidation Zone. The overall shape of the Pyrolysis Zone may range from a hollow tube to an inverted hollow cone. In the context of a gasification process, the "Pyrolysis Zone" means the phase where feedstock begins to fluidize and decompose.

"Reduction Zone", with regard to a gasifier, means the zone of the gasifier where Producer Gas mixes with Biochar, cools and produces additional Producer Gas. The overall shape of the Reduction Zone is that of a hollow tube, being wider than the outlet of the Oxidation Zone. In the context of the gasification process, the "Reduction Zone" means the phase where Producer Gas mixes with Biochar.

Overview of the Gasifier Zones

The present invention relates to a method and apparatus for gasifying carbon-containing biomass feedstock. The gasifier comprises a plurality of conjoined and vertically positioned tubes. The tubes have an interior wall and exterior wall and a proximal and distal end wherein the proximal end provides an inlet and the distal end provides an outlet. The gasifier has three separate sequential reaction zones: (1) a Pyrolysis Zone; (2) an Oxidation Zone beneath the Pyrolysis Zone; and (3) a Reduction Zone beneath the Oxidation Zone. A rotating and vertically adjustable grate is located below, but not attached to, the Reduction Zone. Unlike other gasifiers, this is a partially open core gasifier; there is no airtight bottom wall sealing the Reduction Zone or the bottom of the gasifier itself.

FIGS. 1 and 2 show a cutaway front view of a gasifier. This downdraft gasifier is a sequential, co-current flow, gravity-assisted, thermo-chemical phase change gasifier having at least three zones: a Pyrolysis Zone 20, an Oxidation Zone 30 and a Reduction Zone 40. The gasifier partially oxidizes a portion of the feedstock, which releases enough heat activation energy to start a thermo-chemical solid-to-gas phase change reaction of the remaining feedstock into Producer Gas. The process of gasification is a sequence of reactions including water evaporation, lignin decomposition, cellulosic deflagration and carbon reduction and is controlled by injecting Oxidant Streams into the partially pyrolysed feedstock. Although the present invention will be described in the context of a method and apparatus for processing biomass, the principles described may be applied to many other types of feedstock and various embodiments will be readily apparent to those skilled in the art.

The interior of the entire gasifier is lined with silica carbide, silica oxide, aluminum oxide, refractory alloys, other ceramics or another material having similar properties that is stable at high temperatures. Non-volatile and ungasified materials are separated from the Producer Gas by gravity as these materials fall to the bottom of the gasifier. This high efficiency gasifier converts the chemical potential energy of feedstock into Producer Gas, with the average amount of Biochar generated being about 1%-10% by weight of the original feedstock.

Figures 3, 4:
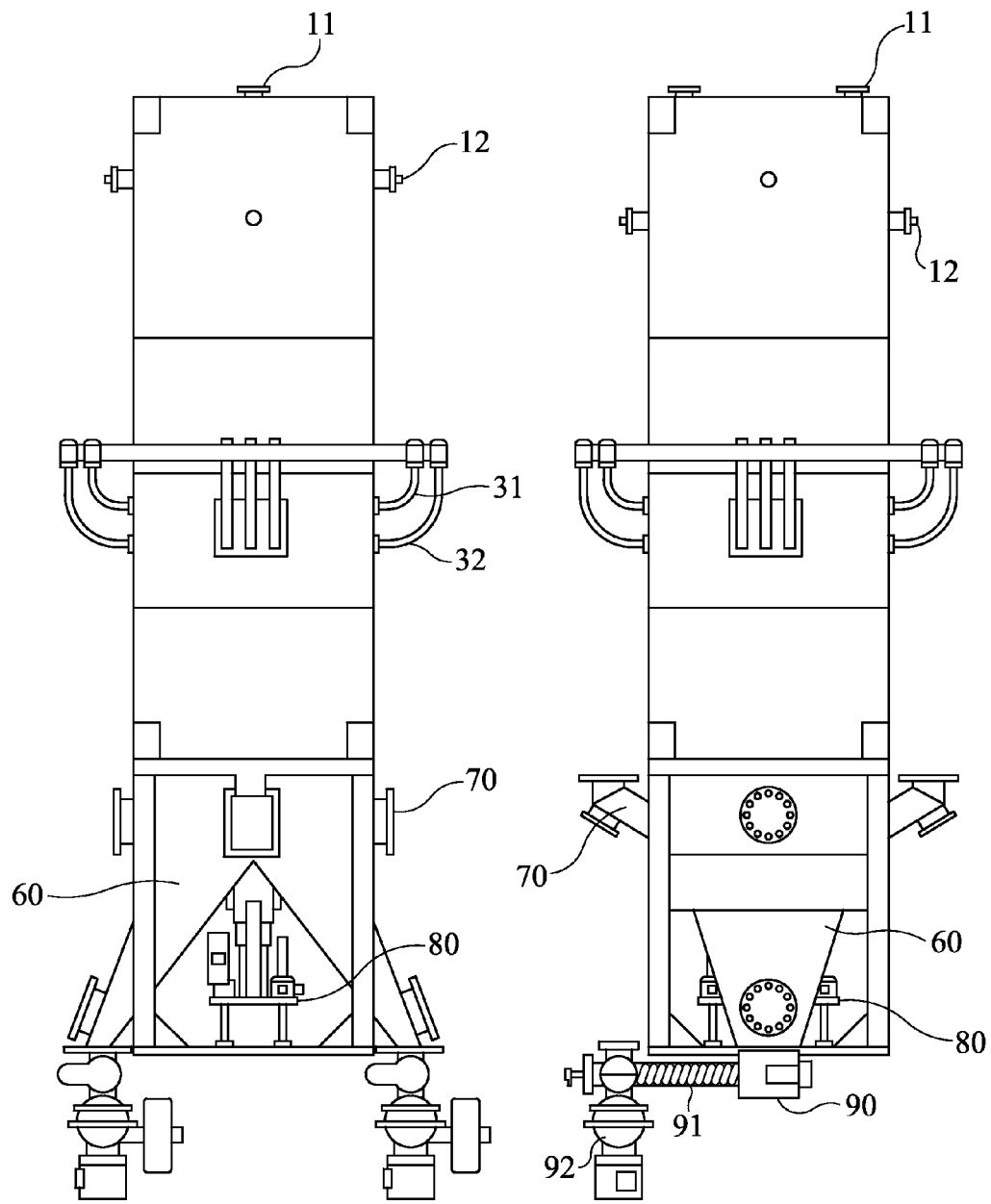
FIG. 3 shows the exterior front view of a gasifier.
FIG. 4 shows the exterior side view of a gasifier.

FIGS. 3 and 4 show the exterior front and side views of a gasifier. Feedstock moves downward in the gasifier as gasification takes place. As the gasifier reaches a steady operating state (i.e., the state wherein each zone of the gasifier has reached a steady and sustained temperature), a vertical temperature gradient forms inside the gasifier and the feedstock stratifies into a sequence of layers or zones roughly corresponding to the Pyrolysis Zone 20, the Oxidation Zone 30 and the Reduction Zone 40 based on the steps in the gasification process. There are no fixed boundaries between these zones, but instead the boundaries are contiguous. Therefore there are transitional gradients having mixed properties of each of the adjacent zones (i.e., feedstock pyrolysis may begin in the Drying Zone 10 and oxidation may begin in the Pyrolysis Zone 20). Feedstock is maintained at a level above the Pyrolysis Zone 20 and pulled down through the Pyrolysis Zone 20 by gravity so that descending feedstock replaces feedstock that has been gasified. Gases and feedstock flow in a downward direction inside the gasifier. Solid materials flow through the gasifier by gravity. Gases move downward through the gasifier by pressure differential.

Solids (e.g., feedstock and Biochar) are held inside the gasifier by a vertically adjustable, rotating grate 50 located just below the Reduction Zone 40 of the gasifier, as shown in FIGS. 1, 2, 3 and 4. The residence time of solids within the gasifier is controlled by the rotational speed of the grate 50, the vertical position of the grate 50, and the rate of gasification (i.e., phase change) within the gasifier. The Biochar accumulates on top of the grate 50 and acts as a pseudo-seal for the bottom of the gasifier, which then allows the gasifier to pressurize, and maintain pressurization even as Biochar continuously leaves the gasifier. Biochar falls from the bottom of the gasifier through the rotating grate 50 or out the Bypass 49. Once the Biochar falls from the grate 50 or the Bypass 49, it falls into one or more collection chutes 60 below the grate 50 and then into a residue box 90, where it is removed from the gasifier by an auger 91.

In one embodiment, the zones of the gasifier include: the Drying Zone 10, the Pyrolysis Zone 20, the Oxidation Zone 30, the Reduction Zone 40 with a grate 50 located underneath the gasifier. Below the gasifier are gas collection vents 70, Biochar collection chutes 60 and a Biochar residue box 90.

Figure 5:
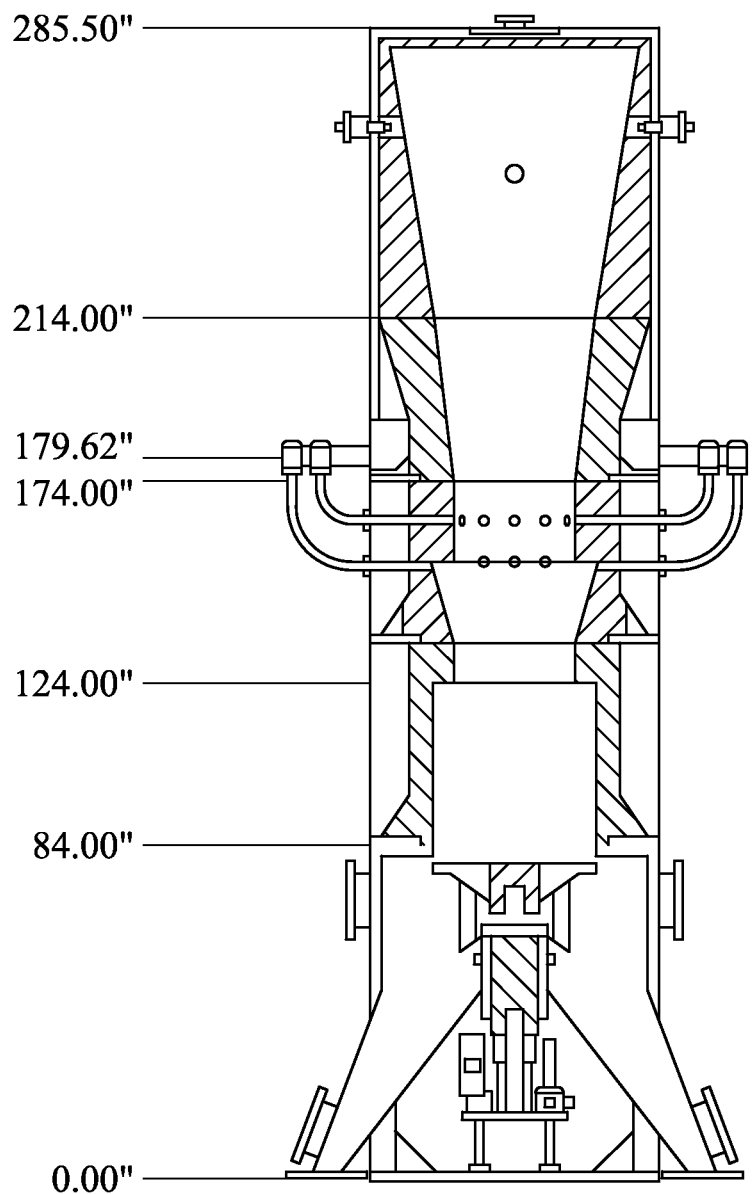
FIG. 5 shows a cutaway front view of a gasifier with dimensions shown in inches.
Figure 6:
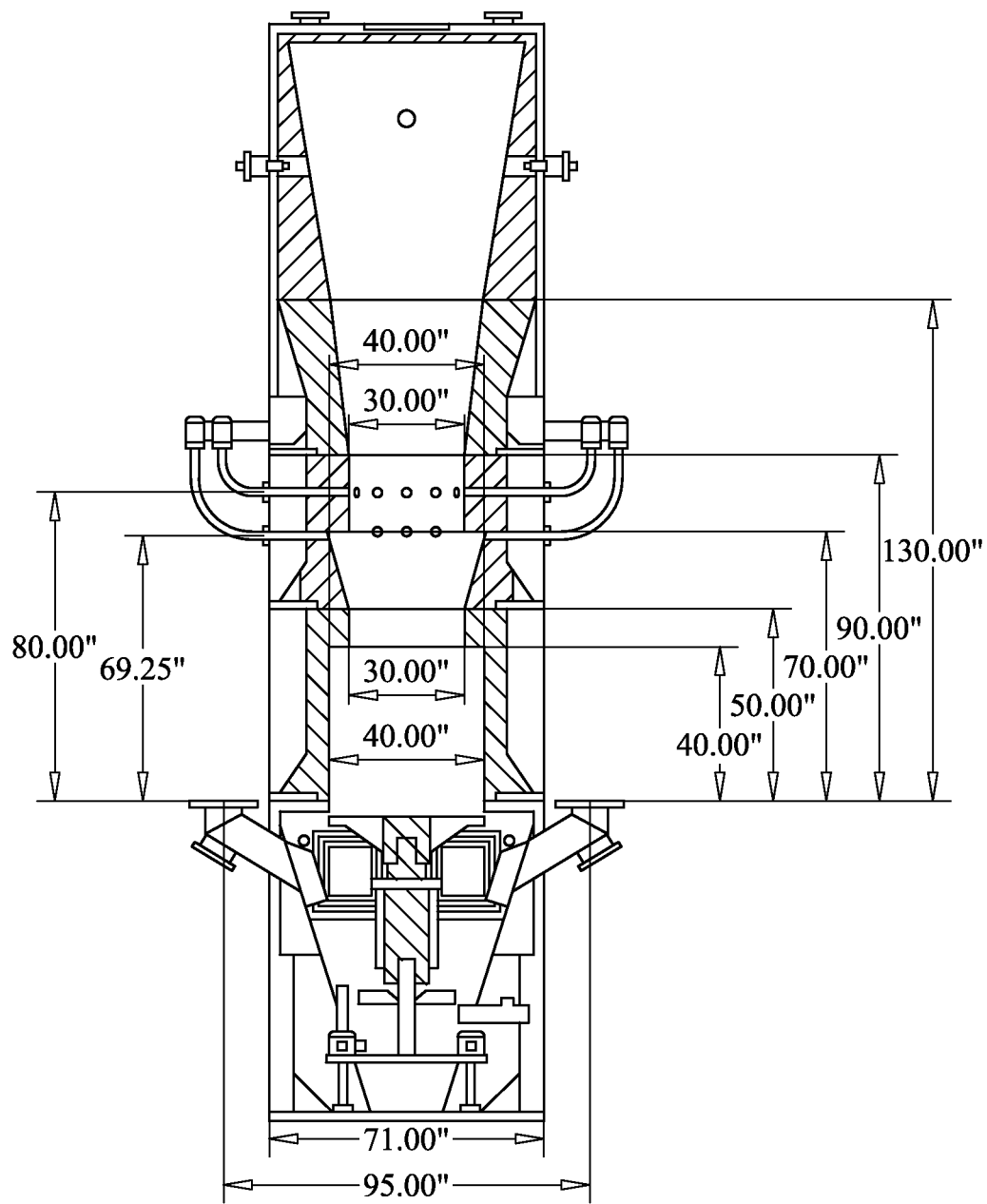
FIG. 6 shows a cutaway side view of a gasifier with dimensions shown in inches.

FIGS. 5 and 6 show a cutaway front and side view of a gasifier with dimensions.

The Drying Zone (optional)

Overall Description, Size and Functioning.

In the Drying Zone 10, moisture within the feedstock is evaporated as it is exposed to radiant heat emitting from the Oxidation Zone 30. The water vapor flows downward through the Pyrolysis Zone 20 toward the Oxidation Zone 30 along with the Bed Oxidant Stream and the Purge Oxidant Stream being fed into the gasifier. Temperatures in the Drying Zone 10 can vary extensively depending on how the gasifier is operated. By way of example, for woodchips with 25% moisture content, the normal range of temperature in the Drying Zone 10 is about 100 to 300° F. The depth of the Drying Zone 10 in one embodiment may be between zero and six feet tall. This depth may increase with the moisture content of the feedstock, the size of the gasifier and the embodiment of the gasifier used. Radiant heat from the Oxidation Zone 30 drives the evaporative processes. However, preheating the Bed Oxidant Stream and the Purge Oxidant Stream can accelerate the drying process.

Drying the feedstock inside the gasifier is an endothermic process, and so energy (i.e., heat) is required to dry and release water from the feedstock as steam, which steam assists the reactions occurring below. The wetter the feedstock, the more energy the Drying Zone 10 requires.

The primary physical change in the Drying Zone 10 is:

$$H_2O_{(l)} + Heat \rightarrow H_2O_{(g)}$$

Wherein "H" is Hydrogen, "O" is oxygen, "l" is liquid, and "g" is gas.

Description of the Feeding Mechanism and Fill Level Indicators

Because the gasifier becomes pressurized during operation, a Pressure Lock may be used to bring feedstock into the gasifier while maintaining the gasifier's pressure. A top valve of the Pressure Lock opens to admit feedstock into the Pressure Lock and then closes. The interior of the Pressure Lock pressurizes to match the air pressure of the Pyrolysis Zone 20 (or optional Drying Zone 10), which may be controlled by a user through the Control Systems, before a bottom valve opens allowing the feedstock to leave the Pressure Lock and enter the gasifier at the adjusted air pressure.

The Pressure Lock may be fabricated from materials such as Schedule 40 seamless carbon steel pipe, 150 pound class steel flanges and standard 150 pound class slide gate valves, such as knife-gate valves. This Pressure Lock assembly may be integrated into the equipment design and use a pair of standard industrial knife-gate valves with a pipe between them. The pipe in one embodiment may be 18" schedule 40 pipe orientated vertically. The length of the pipe may be adjusted depending on the feedstock delivery method and desired volume. An example of a Pressure Lock is 72" in length, which will provide 100-120 pounds of feedstock per feedstock dump into the Drying Zone 10 (if applicable) or the Pyrolysis Zone 20. In one embodiment, attached to the pipe are threaded couplings for receiving (1) a level switch, such as a rotary level switch, limit switch, photon switch, or a laser switch, and (2) a pressure transmitter, and (3) a pressurized air supply line.

The end user may automate the gasifier feedstock filling process with a timer or by using a microwave sensor or another suitable fill level indicator, to detect the presence of feedstock at the fill level in the gasifier and also in the Pressure Lock ("Fill Level Indicators"). The Drying Zone 10 of the gasifier may have one or more Fill Level Indicators 12 capable of functioning in high temperature environments. Once the Fill Level Indicator 12 detects that the feedstock level is low, the automatic feed mechanism begins. One gasifier design with multiple Fill Level Indicators 12 allows more options in choosing the height of the feedstock bed when using an automatic filling system.

In one embodiment, the top valve of the Pressure Lock opens and a bucket loading mechanism dumps feedstock into the Pressure Lock until a Fill Level Indicator in the Pressure Lock detects that it is full. The top valve of the Pressure Lock closes and the Pressure Lock pressurizes to match the pressure of the Drying Zone 10 (if applicable) or the Pyrolysis Zone 20. Then, the bottom valve of the Pressure Lock opens and deposits the feedstock onto a pressurized auger that is connected to the Drying Zone 10 (if applicable) or the Pyrolysis Zone 20. The auger then deposits the feedstock into the top of the gasifier. The gasifier's control systems determine when to initiate each feedstock fill cycle based on the signals, such as temperature or pressure changes, received from various sensors and indicators on the gasifier.

The Pyrolysis Zone

Overall Description, Size and Functioning

The Pyrolysis Zone 20 is directly below the Drying Zone 10 (if a Drying Zone 10 is included) within the gasifier. The Pyrolysis Zone 20 may be increased or decreased in height based on the properties of the predominant type of anticipated feedstock. A taller Pyrolysis Zone 20 will accommodate wetter and/or more complex materials that require more drying and longer pyrolysis times.

In the Pyrolysis Zone 20, vapors, oils, and constituent gases are distilled and moved downward by the effects of gravity, pressure differences and steam created in the Drying Zone 10 and the Pyrolysis Zone 20. The Pyrolysis Zone 20 is endothermic at the top and relies on heat released from below.

Toward the bottom of the Pyrolysis Zone 20, where the temperature increases, the feedstock begins to spontaneously break down as it becomes chemically unstable at the elevated temperatures. Therefore, the decomposition of feedstock occurring in the lower section of the Pyrolysis Zone 20 is exothermic and releases heat. In one embodiment, the Pyrolysis Zone 20 is four to six feet deep.

Pyrolysis chemistry is highly complex. The principal chemical and physical changes occurring in this zone can be simplified and represented by the following:

$$C_xH_yO_z(s) + \text{Heat} \rightarrow \text{Organic Vapors (formaldehyde, alcohols, tars, etc.)}$$

$$C_xH_yO_z(s) \rightarrow CH_4 + H_2 + C(s) + \text{Organic Vapors (tars)} + \text{Heat}$$

Because some Oxygen is present in the Pyrolysis Zone 20 from the Oxidant Streams being fed into the gasifier, oxidation may occur as feedstock approaches the bottom of the Pyrolysis Zone 20.

The Oxidation Zone

Overall Description, Size and Functioning

The Oxidation Zone 30 is the zone in the gasifier leading up to and away from the Oxidation Band 350 or the general step of the method including formation of the Oxidation Band 350. The Oxidation Zone 30 is where the Oxidation Band 350 forms and represents the hottest step in the gasification process and is where the cellulosic fraction of the feedstock converts from a solid to a gas.

The First Gradient (The Induced Feedstock Gradient)

Figure 7:
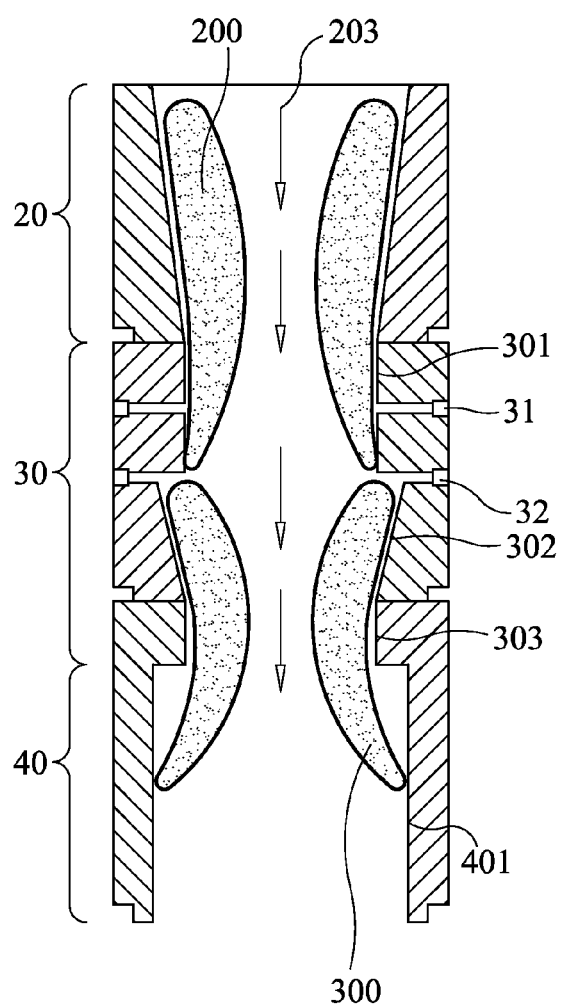
FIG. 7 shows a cutaway side view of a gasifier illustrating the densest portion of an induced and an entrained gradient.
Figure 8:
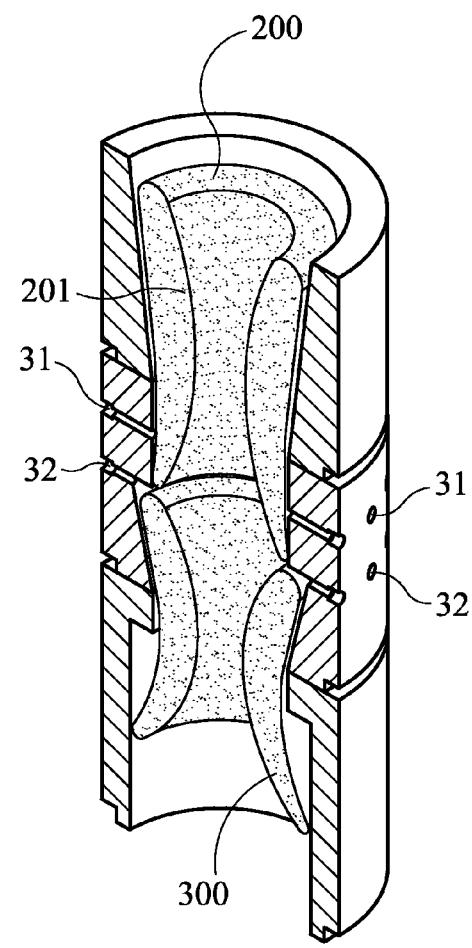
FIG. 8 shows a cutaway perspective view of a gasifier illustrating the densest portion of an induced and an entrained gradient.

Shown in FIGS. 7 and 8, during operation, the flow of an Oxidant Stream through Pyrolysis Zone 20 induces a feedstock gradient to form (1) vertically, beginning toward the top of the outside wall of the Pyrolysis Zone 20 and ending down at a lower ring of Plano Air Inlets 32 in the Oxidation Zone 30 and (2) horizontally, beginning in the center of the gasifier and ending at the wall of the gasifier (the "Induced Feedstock Gradient").

As shown in FIGS. 7, 8, 9, and 10, this Induced Feedstock Gradient is an increasing and differential density of feedstock becoming denser toward the perimeter of the gasifier wall and above the Oxidation Band 350 (the "Densest Portion") formed by at least four factors acting in concert: (1) the Pressure Wave from the Oxidation Band 350 pressing feedstock against the interior wall of the gasifier; (2) the geometry of the Pyrolysis Zone 20 and the Oxidation Zone 30 (i.e., angles of the walls); (3) the total volume of the Oxidant Stream flowing into the Pyrolysis Zone 20 and the Oxidation Zone 30; and (4) the relative volume of the Oxidant Stream flowing into each of the Pyrolysis Zone 20 and the Oxidation Zone 30. The Densest Portion of the Induced Feedstock Gradient is illustrated at 200.

Feedstock travels through the gasifier at different velocities. Some of the feedstock is steadily progressing down the gasifier in the Gasifier Flow Lane 203, while other feedstock may pause or slow at various points in the gasifier. Feedstock moves more slowly and/or is suspended within the Induced Feedstock Gradient 200. The Densest Portion of the Induced Feedstock Gradient 200 is denser and slower moving feedstock than the feedstock in the Gasifier Flow Lane.

The Densest Portion of the Induced Feedstock Gradient 200 ends at the lower Plano Air Inlets 32 where the Oxidation Zone 30 dilates to a wider diameter. In one embodiment, this dilation is designed to be a Kline-Fogelman step in order to direct and control the rate of flow of gases and solids moving down the gasifier.

Ordinarily, as gases cross a step such as a Kline-Fogelman step, an eddy is formed. The lower ring of Plano Air Inlets 32 in the Oxidation Zone 30 inject air into the location where the eddy would otherwise form. This incoming air stream collides with the Producer Gas and feedstock coming down the Gasifier Flow Lane 203, redirects hot gases away from the wall of the gasifier, counteracts the formation of an eddy, and fuels the Oxidation Band 350.

As conditions in the gasifier change, the Induced Feedstock Gradient may also change allowing for movement of the Oxidation Band 350 and the Gasifier Flow Lane 203 inside the gasifier. This is not possible in other gasifiers where the Gasifier Flow Lane 203 would be formed against the immovable outer wall of the gasifier.

The Oxidation Band

Figure 9:
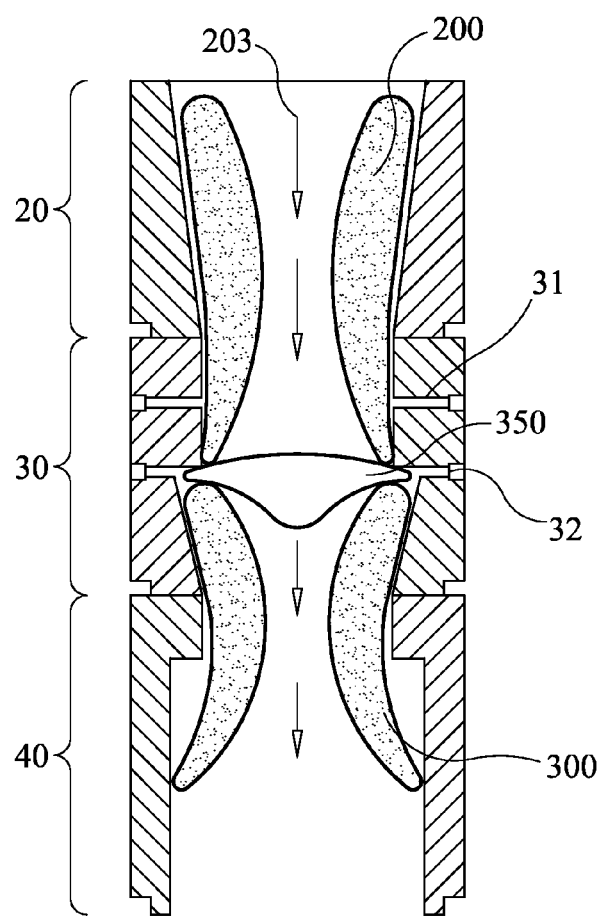
FIG. 9 shows a cutaway side view of a gasifier with an oxidation band.
Figure 10:
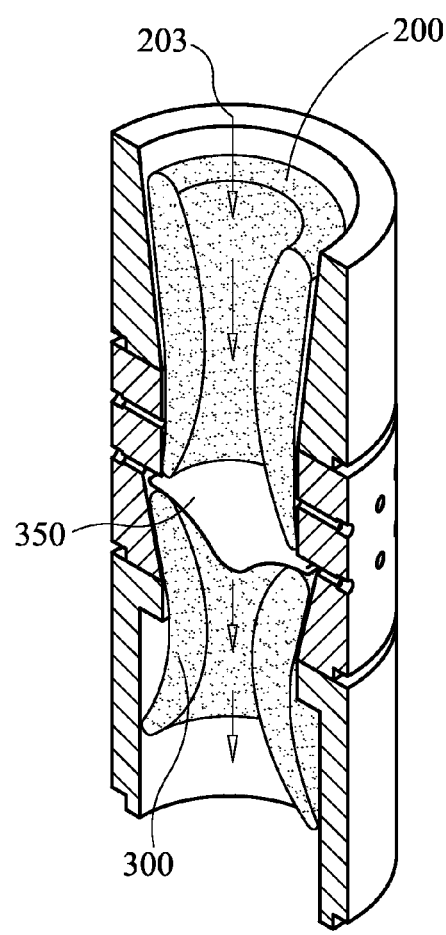
FIG. 10 shows a cutaway perspective view of a gasifier with an oxidation band.

Shown in FIGS. 9 and 10, the feedstock in the Gasifier Flow Lane 203 travels down through the gasifier into the Oxidation Band 350. The Oxidation Band 350 is the point where significant heat is liberated by the deflagration of the cellulose matter in the feedstock. Once initiated during start-up, the Oxidation Band 350 is sustained by the addition of Oxidant Streams from the Plano Air Inlets 31, 32 and feedstock descending from above. The Oxidation Band 350 partially oxidizes the feedstock into Biochar and constituent gases of Producer Gas. Tar vapors generated in the Pyrolysis Zone 20 are further decomposed in the presence of steam under the high temperatures of the Oxidation Band 350 into additional Producer Gas.

As shown in FIGS. 7, 8, 9 and 10, the overall shape of the Oxidation Zone 30 is of a hollow tube, the tube having an inlet 301 and an outlet 303 of approximately the same size but is dilated in the middle 302. This is the opposite of traditional downdraft gasifiers where the Oxidation Zone narrows into a restriction point according to Superficial Velocity Theory.

In one embodiment, the inlet 301 and the outlet 303 of the Oxidation Zone 30 are half the diameter of the dilated section 302 of the Oxidation Zone 30. There are at least two rings of Plano Air Inlets 31, 32. In one embodiment, a higher ring 31 being approximately 11 inches above the lower ring 32 and a lower ring of Plano Air Inlets 32 being at the widest part of the dilated section 302 of the Oxidation Zone 30.

The extremely high temperatures generated by this Oxidation Band 350 produce the heat that drives the chemical and physical reactions in the Pyrolysis Zone 20 and Drying Zone 10 above (if applicable). The Oxidation Band 350 naturally tends to move upward in the gasifier toward the unconsumed feedstock and the Oxidant Stream supply above. Below the Oxidation Band 350 is a mixture of Biochar, which is relatively stable at high temperatures. The gasifier is designed to allow the Oxidation Band 350 to move up and down within the gasifier. In one embodiment, the Oxidation Band 350 may be held in place in the gasifier by using a grate 50 (located below the Reduction Zone 40) to remove the Biochar beneath the Oxidation Band 350, counteracting the tendency of the Oxidation Band 350 to move upward. Whenever the grate 50 stops rotating, the Oxidation Band 350 starts rising.

In one embodiment, a higher ring of Plano Air Inlets 31 positioned above the lower set of Plano Air Inlets 32, allows additional Oxidant Streams to be injected to the feedstock just before it enters the Oxidation Band 350. Using the rotational speed of the grate 50, the rate and ratio of the Bed Oxidant Stream, the Purge Oxidant Stream and the Plano Oxidant Streams, the Oxidation Band 350 can be held at any desired location within the gasifier. In one embodiment, the Oxidation Band 350 is held just below the lower ring of Plano Air Inlets 32.

The partial oxidation of feedstock is also complex but can be simplified into the following expressions:

Feedstock-Bound $C + \tfrac{1}{2} O_2 \rightarrow CO + Heat$

Feedstock-Bound $C + O2 \rightarrow CO2 + Heat$

Feedstock-Bound $H + O2 \rightarrow H2O + Heat$

Feedstock-Bound $H \rightarrow H_2$ $CO + 3H_2 CH_4 + H_2O + Heat$ $CO_2 + 4H_2 \rightarrow CH_4 + 2H_2O + Heat$ Solid C Residue $+ 2H_2 \rightarrow CH_4 + Heat$ $CO + H_2O \rightarrow CO_2 + H_2 + Heat$ The reactions in the Oxidation Zone 30 are exothermic and release the heat that operates the entire gasifier.

The Second Gradient (The Entrained Biochar Gradient)

Also shown in FIGS. 7, 8, 9 and 10, just below the Oxidation Band 350, the beginning of a second gradient of Biochar forms (1) vertically, beginning just below the lower ring of Plano Air Inlets 32 in the Oxidation Zone 30 and extending down along the wall of the Oxidation Zone 30 into the Reduction Zone 40 (2) horizontally, from the center of the gasifier to the wall of the gasifier (the "Entrained Biochar Gradient"). As Biochar leaves the Oxidation Band 350, the diameter of the Oxidation Zone 30 narrows to approximately the same size as the inlet 301 to the Oxidation Zone 30. The Pressure Wave from the Oxidation Band pushes the Biochar against the narrowing wall of the Oxidation Zone. The Densest Portion of the Entrained Biochar Gradient is illustrated at 300. The Pressure Wave slows the movement of the Densest Portion of the Biochar in the Entrained Biochar Gradient 300 relative to Biochar in the Gasifier Flow Lane 203. The Gasifier Flow Lane 203 remains intact even though the feedstock has changed phase, and Producer Gas and Biochar are now moving downward instead of feedstock.

The Densest Portion of the Entrained Biochar Gradient 300 runs down along the wall of the Oxidation Zone 30 into the Reduction Zone 40. As the Reduction Zone 40 is wider than the Oxidation Zone 30, the entrance to the Reduction Zone 40 forms another step. In one embodiment, the angled of the wall of the Oxidation Zone 30 and the inlet to the Reduction Zone 40 form a Kline-Fogleman step. As the Producer Gas crosses the step into a wider Reduction Zone 40 (i.e., a diameter expansion in the Reduction Zone 40), an eddy forms in the Reduction Zone 40. This eddy encourages mixing between the Producer Gas and Biochar in the Reduction Zone 40.

Simulation of a Throat and Hearth

Unlike traditional downdraft gasifiers, this downdraft gasifier does not have a restriction zone in the Oxidation Zone 30, but instead the Oxidation Zone 30 increases in size. Nearly all current downdraft gasifiers apply the Superficial Velocity Theory and are, therefore, constructed with a restriction in the Oxidation Zone 30 in order to achieve a useable quality Producer Gas. Additionally, most current downdraft gasifiers use a vacuum to pull Producer Gas through the gasifier.

The two gradients that are formed in this gasifier, the Induced Feedstock Gradient above the Oxidation Band 350 and the Entrained Biochar Gradient below the Oxidation Band 350 work together to simulate a throat and hearth inside the gasifier. The advantages of this approach are that the Oxidation Band 350 can move up or down in the gasifier without damaging or possibly destroying the gasifier itself, and the inside of the gasifier can adapt to different types and mixtures of feedstock. Other gasifiers with a fixed throat and hearth must be calibrated to a small range of feedstock, cannot be easily adjusted to accommodate other feedstock types, and cannot be adjusted during operation to accommodate changes.

The Reduction Zone

Overall Description, Size and Functioning

As shown in FIGS. 1, 2, 7, and 8, the Reduction Zone 40 of the gasifier is equal to or greater in diameter than the outlet 303 of the Oxidation Zone 30. The two primary functions of the Reduction Zone 40 are to gasify residual carbon from the Biochar and to cool the Producer Gas. Both functions occur by the same mechanism, namely the endothermic reactions of Producer Gas constituents and the solid carbon contained within the Biochar.

As discussed above, when Producer Gas and Biochar enter the Reduction Zone 40, a turbulent eddy forms across the step between the Oxidation Zone 30 outlet 303 and the wider Reduction Zone 40. This turbulence in the Reduction Zone 40 causes much better mixing of Producer Gas with Biochar in the Reduction Zone 40 than in other gasifier designs. This allows for nearly complete gasification of the carbon in the bed, and maximizes the cooling effect. In one embodiment, the Reduction Zone 40 of the gasifier maintains about a 2 to 6 foot bed of Biochar above the grate 50.

Producer Gas exits typical downdraft gasifiers at temperatures around 1,500° F. or higher. Producer Gas exits this gasifier at temperatures less than 1,500° F. In one embodiment, it exits at temperatures less than 1,00° F. Also, the thick bed of Biochar allows about 90 to 99% of the fuel carbon to exit this gasifier as Producer Gas, depending on the feedstock.

The reduction reactions occurring in downdraft gasifiers have been well studied and are understood to involve:

$Carbon + CO_2 + Heat \rightarrow 2CO$ $Carbon + H_2O + Heat \rightarrow CO + H_2$ $Carbon + 2H_2O + Heat \rightarrow CO2 + 2H_2$ $CO_2 + H_2 + Heat \rightarrow CO + H_2O$ The Gasifier Grate The grate 50 of the gasifier may be made of stainless steel or another suitable material that is both durable, heat resistant and non-reactive such as silica carbide, silica oxide, aluminum oxide, refractory alloys or other ceramics, the grate having a top and a bottom face. In one embodiment and shown in FIGS. 3 and 4, the bottom face of the grate and shaft may be mounted on an elevating platform 80 that moves up and down and is controlled by variable control systems. As shown in FIGS. 3 and 4, the top face of the grate 50 is positioned below the lower edge of the Reduction Zone 40. In one embodiment, the Bypass is a gap of 0.25 to 2 inches between the Reduction Zone 40 and the top face of the grate 50.

The Spiral Groove

Figure 11:
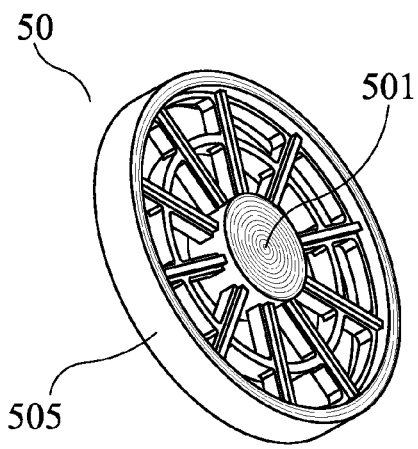
FIG. 11 shows a perspective view of a grate frame.

FIG. 11 shows the gasifier grate 50 which provides support for all of the solids in the gasifier. In one embodiment, the grate 50 has a frame 505 and two faces, a top face and a bottom face.

Figure 12:
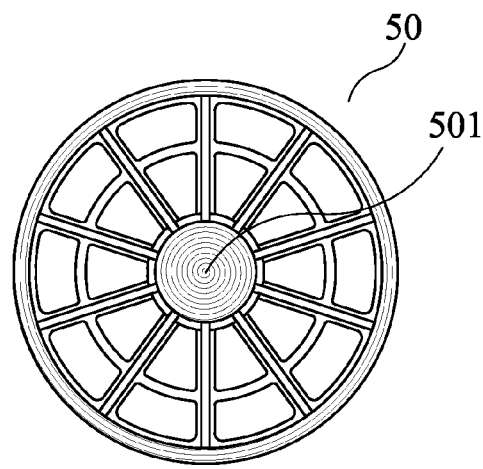
FIG. 12 shows a top view of a grate frame.

FIGS. 11 and 12 show the top face of the grate 50 has a spiral groove 501. The spiral groove 501 is oriented in the gasifier so that it faces the Reduction Zone 40. The spiral groove 501 has a starting point at the center of the grate and a tail continuing outward to the edge of the grate 50. Therefore in one embodiment the spiral grove spans the entire top face of the grate. The purpose of the spiral groove 501 is that it naturally moves Biochar outward from the center of the grate 50 to the edge of the grate 50 as the grate 50 rotates opposite the direction of the spiral groove 501. The Biochar follows the tail of the spiral groove 501 as the grate 50 turns in the opposite direction until the Biochar is forced from the Reduction Zone 40 through the Bypass.

In one embodiment of the Reduction Zone 40, silica carbide, silica oxide, aluminum oxide, a refractory alloy, other ceramics or some other heat resistant, high density, course material, lines the walls of the Reduction Zone 40. This heat resistant, high density, course material acts as file to grind away at any Biochar that is pressed against and dragged along the outer wall of the Reduction Zone 40 by the rotating grate 50. This combination of having a spiral groove 501 in the grate forcing Biochar toward and along the course wall of the Reduction Zone 40 assists in grinding large chunks of char into small enough pieces that they escape the Bypass. A person having ordinary skill in the art will recognize that different types of spirals may be used (e.g., Archimedean, logarithmic, etc.).

In one embodiment, the spiral groove 501 in the grate is a "v" shaped Archimedean groove 502, where the outer edge of one groove in the spiral meets the inner edge of the adjacent groove to form a raised edge. A purpose of the "v" shaped groove is to avoid having any 90° angles, which would otherwise create hot spots or thermally unstable sections of the grate 50.

Raising and Lowering the Grate/Bypass

In one embodiment, the grate 50 can be raised and lowered to create a higher or lower Bypass, allowing larger items that have inadvertently entered the gasifier and/or materials that have not gasified to be removed without shutting the gasifier down (e.g., brick, rocks, etc.). In an embodiment with a spiral groove 501 in the grate 50, these foreign bodies will be forced to the wall of the Reduction Zone 40, and then the grate 50 can be lowered to allow them to be discharged through the Bypass. This design allows for the gasifier to remain in service and still remove large, ungasified objects from the Reduction Zone 40. The ability to raise and lower the grate 50 can also be used if maintenance is ever required inside the gasifier. In addition, the Bypass 49 functions to control Producer Gas flow out of the Reduction Zone 40, the Bypass 49 acting similar to a valve. For example, a short Bypass increases resistance to Producer Gas flow through the grate 50 and causes pressure to build in the gasifier.

Elliptical Holes in the Grate

Figure 13:
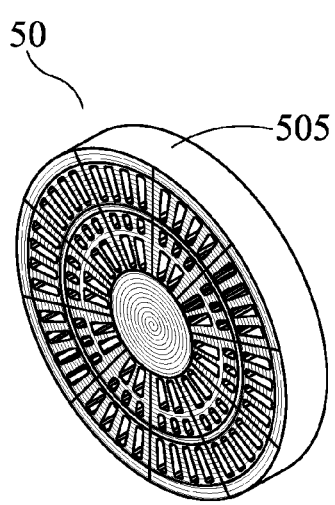
FIG. 13 shows a perspective view of an assembled grate having a spiral groove.
Figure 14:
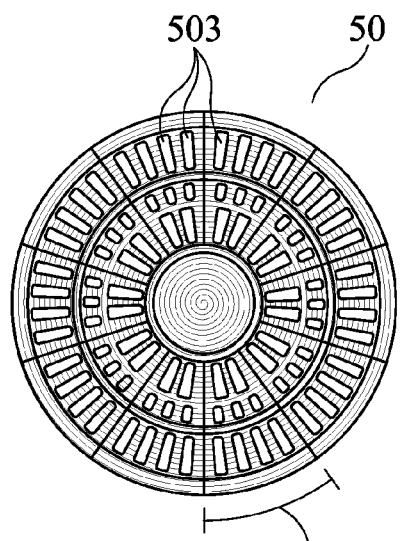
FIG. 14 shows a front view of an assembled grate having holes cut in the grate.
Figure 15:
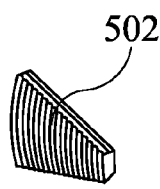
FIG. 15 shows a perspective view of removable segment of a grate.
Figure 16:
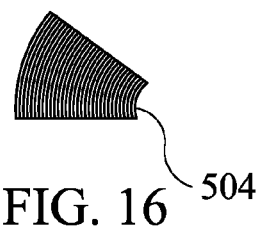
FIG. 16 shows a top view of a removable segment of a grate.

FIGS. 13 and 14, show the assembled grate. FIGS. 15 and 16 show the grate "pie slice" segments 502. FIGS. 13 and 14 show a perspective and front view of an assembled grate having elliptical holes 503. In one embodiment the elliptical holes 503, such as kidney-shaped or oval-shaped holes are distributed symmetrically across the grate 50 (except there are no holes in the center of the grate above the mechanical shaft that lifts and rotates the grate). The purpose of the holes 503 is both to allow Biochar and Producer Gas to pass through the grate into the Biochar collection chute 60 below.

Pie Slice Inserts to the Grate

In one embodiment, the "pie slice" segments 502, 504, sit on a frame 505 of the grate 50. When each of the segments 504 is inserted into the frame 505, the grate is formed. This embodiment allows for replacement of a segment 504 rather than the entire grate 50 in the event part of the grate 50 becomes damaged, and also allows the gasifier to be fitted with customized segments 504 designed for particular types of feedstock.

Grate with Multiple Features

FIG. 15 shows a perspective view of removable segment of a grate. In one embodiment, the grate 50 also has a spiral groove 501 cut as a "v" 502 and elliptical, kidney or oval-shaped holes 503 cut through the spiral groove 501. FIG. 16 shows a top view of a removable segment of a grate.

Controlling the Gasifier Using the Grate

The shaft supporting and rotating the grate 50 can be formed of one or more pieces, depending on the size of the grate 50. The rotational speed of the grate 50 may be calibrated by a Control System, but typically ranges from 0.0001 RPM to 1 RPM, depending on the non-volatile components of the feedstock and the rate of production of Producer Gas. Since the Oxidation Band 350 effectively rides on top of the bed of Biochar in the Reduction Zone 40, if the bed of Biochar in Reduction Zone 40 gets too thick, the Oxidation Band 350 will rise into the Pyrolysis Zone 20. Using thermocouples or other sensors to monitor the location of the Oxidation Band 350, the gasifier's Control System discussed below can be programmed to speed up the rotation of the grate 50 and remove Biochar at a higher rate, which reduces the height of the Biochar bed and lowers the Oxidation Band 350 back to appropriate locations. Conversely, the gasifier's Control System can slow the grate 50 if the bed of Biochar becomes too shallow and, consequently, the Oxidation Band 350 moves too close to the grate.

Char Collection Chute

Shown in FIGS. 1, 2, 5 and 6, below the gasifier is a Biochar collection chute 60, which may be made of steel, stainless steel or another strong, thermally stable, non-porous material. As Biochar exits the bottom or sides of the grate 50, it falls down the Biochar collection chute 60 below the gasifier. The Biochar collection chute 60 is arranged at an angle from the direction of the flow of Biochar in the Gasifier Flow Lane 203. In one embodiment, the angle is less than 90°, measured from the direction of Biochar flow in the Gasifier Flow Lane 203. In one embodiment, the angle is 45° to 80°, measured from the direction of Biochar flow in the Gasifier Flow Lane 203. In one embodiment, at least two Biochar collection chutes 60 are symmetrically arranged with respect to center axis of the gasifier.

Producer Gas Collection Vents/Horns

Shown in FIGS. 1, 2, 5 and 6, two or more Producer Gas collection vents 70 are positioned within the Biochar collection chute 60 symmetrically around the axis of the grate 50. The opening to the Producer Gas collection vents 70 faces downward so the Biochar does not fall directly into them as the Biochar falls from the grate 50. As the Producer Gas and Biochar fall into the Biochar collection chute 60, the Biochar separates from the Producer Gas by gravity, and the Producer Gas exits through the Producer Gas collection vents 70.

The Biochar Residue Box

Shown in FIG. 6, the Biochar residue boxes 90 are at the bottom of the Biochar collection chutes 60. The Biochar falls down a Biochar collection chute 60 into a Biochar residue box 90.

The Biochar residue box has a tube-style auger 91 called the "Residue Auger." The Residue Auger 91 moves the Biochar into a pocket valve 92 that is bolted to the end of a cross pipe spool, which is bolted to the Residue Auger 91. In one embodiment, the pocket valve 92 is a standard, air-actuated 8" or 10" ball valve where the ball is sealed on one end. When in the "up" position, the ball forms a bucket. The Residue Auger 91 is controlled by the gasifier's Control System so that while the pocket valve 92 is in the up position, the Residue Auger 91 deposits Biochar into the pocket valve 92. When the Control System stops this process, the Residue Auger 91 stops and the pocket valve 92 rotates to the "down" position, dumping its contents into an external collection bin or some other secondary removal system. Because the ball on the pocket valve 92 is closed on one end, the pocket valve 92 remains sealed at all times and prevents Producer Gas from leaking out of the Biochar residue box 90. A small amount of Producer Gas does escape, but can be vented safely by a high-point vent pipe or drawn out by vacuum pump.

Feedstock Requirements

The gasifier can gasify a very broad range of feedstock. To determine whether a given feedstock or blend of materials will gasify effectively, the feedstock must be porous enough to allow Oxidant Stream to flow through it, have a suitable calorific density (btu/ft$^3$), have a suitable bulk density and a suitable chemical makeup. A person having ordinary skill in the art would recognize a suitable feedstock. In one embodiment of the gasifier, a suitable feedstock may be: (1) 25% or more chemically-bound oxygen content (molecular basis), (2) 10% or less ash content, (3) 30% or less moisture content, and (4) greater than 15 lbs/ft$^3$ bulk density. There is some interaction between these variables.

All forms of biomass contain the basic chemical structure of $C_xH_yO_z$. This molecular structure is inherently unstable at elevated temperatures and will readily break down when heated. This is the fundamental driver of all types of biomass gasifiers. This molecular breakdown is highly exothermic and produces the heat necessary to sustain the further breakdown of biomass. Therefore, practically all forms of biomass are suitable feedstock for the gasifier, provided they meet the porousness and bulk density requirements.

Startup and Shutdown

On start-up, the gasifier is filled up to the middle of the Oxidation Zone 30 with feedstock. A layer of hot charcoal (in one embodiment a layer just a few inches in height) is added to the top of the feedstock through the top of the Pyrolysis Zone 20 or Drying Zone 10 (if applicable). The gasifier is then filled with feedstock to the gasifier's Fill Level Indicator and the gasifier's Control System is started.

Over the next several hours, the gasifier will begin to heat up, and a thermal gradient will start forming. Some low quality gas will be made almost immediately and Producer Gas production will gradually increase and improve as the gasifier heats up.

If the gasifier is operated for an adequate period of time, the lining inside the gasifier will become saturated with heat and the gasifier can be restarted without additional hot charcoal even after several hours of downtime. This is referred to as a "warm-start". In many cases, the gasifier can be shut down for more than 2-3 days and still retain enough internal heat for a warm start simply by restarting the Oxidant Streams. Producer Gas flow from the gasifier stops when the Oxidant Streams stop.

Gasifier Control System

Optimizing the gasifier's operation requires precise real-time adjustments to control the location of the Oxidation Band 350. For example, if a mechanical device were inserted in the Oxidation Band 350 to adjust the rate of the materials leaving or entering, the 3,000° F. temperatures (approximate) in the Oxidation Band 350 would destroy the mechanical device. Therefore, a grate 50 is used to control the removal of Biochar from the gasifier as it can be placed adjacent to the much cooler Reduction Zone 40. The changes to the height of the Biochar bed caused by increasing the rate of removal of Biochar from the Reduction Zone 40 induce some of the necessary changes to adjust the vertical location of the Oxidation Band 350. The variables mentioned below may each be adjusted to induce changes in the Oxidation Band 350.

Several methods and systems may be used as part of the overall Control System to induce changes to and to control the Oxidation Band 350. The Control System uses various algorithms to monitor and adjust the gasifier. The Control System may include subsystems capable of real-time adjustments and account for other methods that may only be adjusted while the gasifier is offline. Adjustments while the gasifier is offline may include: (1) adjusting the physical size and height of the Drying Zone 10 (or removing it); (2) adjusting the size of the holes 503 in the grate 50 (in one embodiment, by replacing its interchangeable segments 504). The Control System may include subsystems to implement real-time adjustments during operation of the gasifier related to: (a) the type of feedstock entering the gasifier; (b) the rate that feedstock enters the gasifier; (c) the fill level of the feedstock in the Drying Zone 10, if applicable; (d) the temperature of the Drying Zone 10, if applicable; (e) the volume, speed and pressure of Oxidant Stream delivered through the inlets at the top of the Pyrolysis Zone 20 (or Drying Zone 10, if applicable); (f) the volume, speed and pressure of Oxidant Stream delivered through the rings of Plano Air Inlets 31, 32; (g) the overall pressure of the gasifier; (h) the differential pressure between the various zones of the gasifier; (i) the location of the Oxidation Band 350 in the gasifier; (j) adjusting the rotational speed of the grate 50; (k) the vertical position of the grate 50 (i.e., adjusting height of the Bypass); (l) the thickness of the Biochar bed in the Reduction Zone 40; (m) testing and sampling the constituent components of the Producer Gas exiting the gasifier; (n) the temperature of the Producer Gas exiting the gasifier; and (o) the Producer Gas collection vent pressure and the pressure of the Producer Gas leaving the gasifier (the above examples, being "Variables").

Variable Frequency Drives

In one embodiment of the gasifier, the Control System can gradually increase or decrease a Variable or start or stop any changes to the Variable entirely. For example, the Control System may need to slightly slow the rotational speed of the grate 50 at one time and then completely stop it at another point. As a person having ordinary skill in the art will recognize, electric motors and drives operate in two general ways some are fixed speed drives and others are variable frequency (speed) drives ("VFDs"). In one embodiment of the gasifier, a VFD is therefore attached to an on/off timer and used to control the rotational speed of the grate 50. By starting and stopping the VFD, the Control System may simulate a slow grate 50 rotation while maintaining sufficient torque from the VFD to rotate the grate 50.

In other applications, such as the Oxidant Stream control system, where a higher torque is not required, the VFD may be used without an on/off timer.

Grate Control

The Control System adjusts the rotational velocity of the grate 50 to adjust several of the Variables, including the differential pressure between the Oxidation Zone 30 and the Reduction Zone 40. An example of the latter is that the differential pressure of the Reduction zone may be maintained by simply controlling the RPM setting of the grate 50.

Oxidant Stream Flow Control

The rate at which Biochar leaves the gasifier also controls the vertical differential pressure across the gasifier (the thickness of the Biochar bed partly determines the pressure of the gasifier because the Biochar forms a pseudo-seal at the bottom of the gasifier). The vertical differential pressure across the gasifier, from the top of the Drying Zone 10 through to the bottom of the grate 50 is therefore controlled, in part, simply by increasing or decreasing the rotational speed of the grate 50, which ejects Biochar from the Reduction Zone 40. Described another way, if Biochar is not ejected fast enough from the gasifier it accumulates in the Reduction Zone 40 and the decreased remaining volume increases the pressure of the Producer Gas in the Reduction Zone 40 and the Oxidation Zone 30. In one embodiment, the vertical differential pressure of the gasifier is controlled by the height of the Bypass; as the height of the Bypass increases (i.e., by lowering the grate 50) the greater the flow of Producer Gas and Biochar from the gasifier.

The rate of Producer Gas generation is proportional to the concentration of Oxygen in the Oxidant Streams and the flow rate of the Oxidant Streams being introduced to the gasifier. The Control System measures and regulates the Oxidant Streams using standard methods known in the art.

Figure 17:
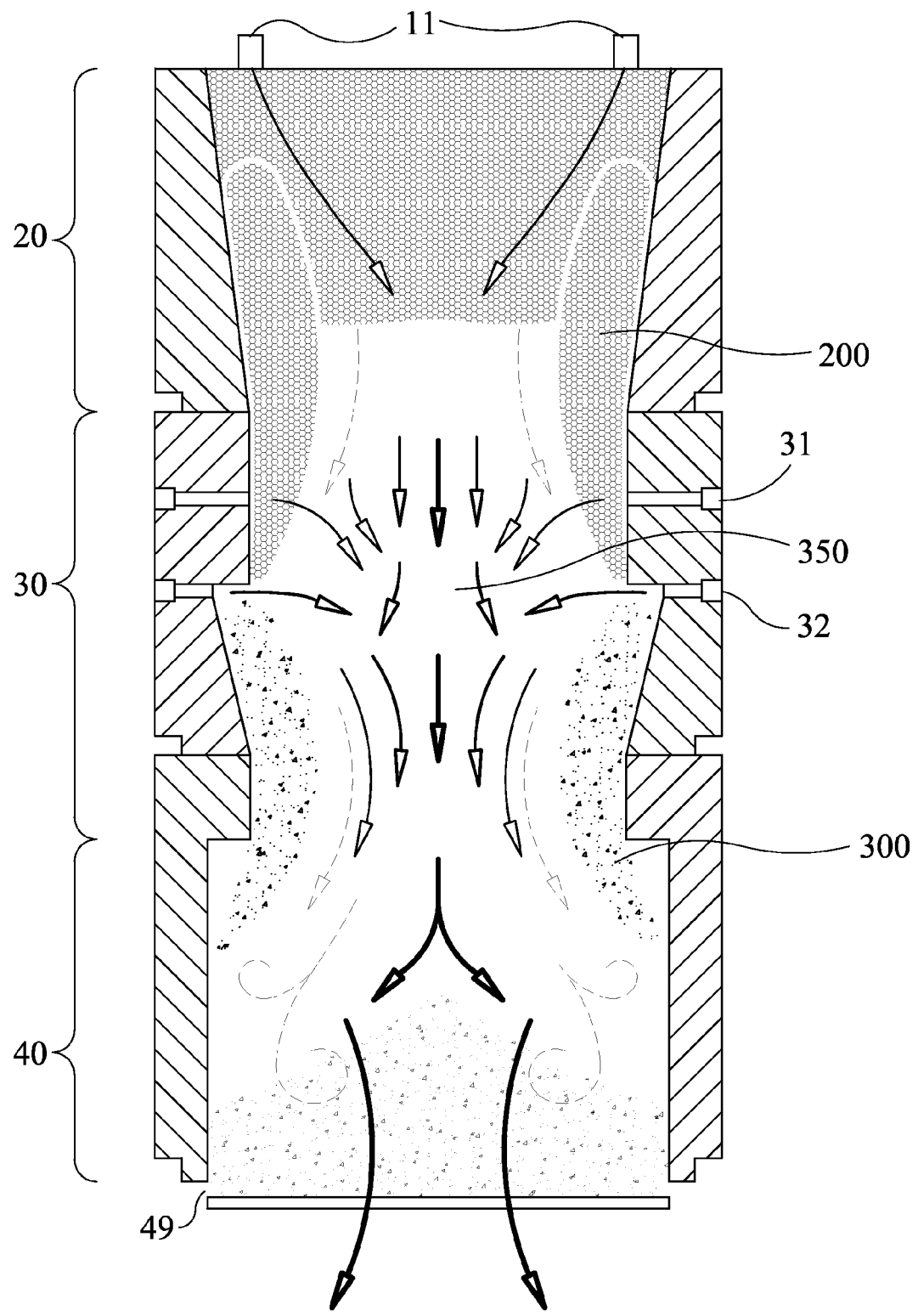
FIG. 17 shows a cutaway side view of a gasifier with arrows depicting the gasification process.

FIG. 17 shows a cutaway side view of a gasifier with arrows depicting the gasification process. Three types of Oxidant Streams enter the gasifier through three separate, corresponding inlet points: Purge Oxidant Streams, Bed Oxidant Streams and Plano Oxidant Streams. The Purge Oxidant Stream is the Oxidant Stream that is introduced to the feedstock and enters the gasifier with the feedstock through the Pressure Lock. The Purge Oxidant Stream also prevents tarry gases from back-flowing into the Pressure Lock. The Bed Oxidant Stream enters the gasifier through inlets 11 located at the top of the gasifier. The Plano Oxidant Streams enter the gasifier through the Plano Air Inlets 31, 32 located in rings around the perimeter of the Oxidation Zone 30. The Control System monitors and adjusts each of these Oxidant Streams to control the total amount of Oxygen in each zone of the gasifier and the rate of Producer Gas being generated. The Control System can adjust the volume and velocity of this Oxidant Stream to adjust for feedstock having differing moisture contents, bulk densities, or even because of changes in the BTU value of a feedstock. The Control System allows for the changes to be made while the gasifier is in operation, so that it does not need to be shut down or be reconfigured.

The more Oxygen fed to the gasifier the faster the feedstock is gasified in the Oxidation Zone. The faster the reaction, the more Biochar is produced and accumulates in the Reduction Zone 40.

Implementing a Control System for variable control of the grate 50 and the Oxidant Stream in the gasifier also ensures the consistency and quality of the Producer Gas.

Thermocouples and Ceramic Lining

There are several different redundant control methods used in the gasifier, and most function as a means by which more precise control can be achieved throughout the process. In one embodiment, an effective control method is to monitor the thermal gradient, or profile, as indicated by the temperatures of each zone. These temperatures are obtained by way of embedded thermocouples inside of the lined wall of the gasifier. This temperature gradient, or profile, is a very good indicator of where each zone is and where it is moving toward within the gasifier. In one embodiment, the Control System uses this information to change the balance of Oxidant Stream at any given zone or to physically change the height of the bed of Biochar in the Reduction Zone 40 by way of the grate 50 rotation and bypass to help maintain and/or sustain each zone above it.

One embodiment improves the consistency of the Producer Gas by lining the entire gasifier with silica carbide, silica oxide, aluminum oxide, refractory alloy, other ceramics or another material that is stable at high temperatures. This lining helps to evenly distribute and conduct heat out from the Oxidation Band 350 and allows the use of thermocouples while protecting them from the reactions occurring inside the gasifier.

The Control System may use all of the different methods and combine said methods into an algorithmic controller. The latter does not only allow for redundancy throughout the Control System but also ensures much greater reliability and efficiency. It furthermore ensures that the Producer Gas is of constant and high quality.

The application and method of gasification described above also provides an effective way of controlling the height of the Reduction Zone 40. A problem in other gasifiers is that the Oxidation Band 350 is limited to one location within the gasifier, and moving it disrupts the function of the process substantially or destroys the gasifier. In one embodiment of this gasifier, the Oxidation Band 350 can move up into the Pyrolysis Zone 20 or down into the Reduction Zone 40 and still be controlled and/or maintained by way of where the Control System allows the Oxidant Stream to be placed and amount of Biochar being removed. Disruption to the height of the feedstock, or the differential pressure across the gasifier can therefore be controlled by way of the grate 50 rotation without risking the Oxidation Band's 350 collapse.

Gas Produced

During operation, the gasifier will create Producer Gas having a calorific density of 125 to 145 btu/ft$^3$. This quality of Producer Gas will continue to be produced for so long as sufficient Oxidant Stream and suitable feedstock are made available to the gasifier. In one embodiment, the gasifier converts between 12 and 120 tons of feedstock per day.

It is clear that while this gasifier is quite different in design than other gasifiers, it also substantially improves the output and quality of Producer Gas, as well as the overall efficiency of the process over other downdraft gasifiers on the market today.

Miscellaneous

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Preferred embodiments of this invention are described herein. Variations of those preferred embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications. within the scope of the claims attached as well as equivalents thereof. Those skilled in the art will appreciate from the foregoing that various adaptations and modifications of the just described embodiments can be configured without departing from the scope and sprit of the invention. Therefore, it is to be understood that, within the scope of the appended claims, the invention may be practiced other than as specifically described herein

What is claimed is:

1. A gasifier comprising:
   a plurality of conjoined and vertically positioned tubes having a proximal end and a distal end, wherein the proximal end provides an inlet and the distal end provides an outlet;
   at least three contiguous reaction zones comprising a pyrolysis zone, followed by an oxidation zone with a dilated middle that is a Kline-Fogelman step, followed by a reduction zone; and
   at least two separate rings of pressurized plano air inlets, configured to deliver adjustable volumes and pressures of oxidant streams,
   wherein the at least two rings of plano air inlets are located around the perimeter of the oxidation zone,
   further wherein at least one of the at least two rings of plano air inlets is located at the dilated middle, and
   further wherein the gasifier is a downdraft gasifier used for gasification of feedstock.

2. The gasifier of claim 1, further comprising an interior wall of the vertically positioned tubes made of silica carbide, silica oxide, aluminum oxide, ceramic or a refractory alloy.

3. The gasifier of claim 1, further comprising at least one fill level indicator in the pyrolysis zone and an automatic feed mechanism that is activated when the at least one fill level indicator detects a low feedstock level.

4. The gasifier of claim 1, wherein at least one of the at least two rings of plano air inlets is located around the dilated middle.

5. The gasifier of claim 1, further comprising a pressure lock.

6. A gasifier comprising:
   a plurality of conjoined and vertically positioned tubes having a proximal end and a distal end, wherein the proximal end provides an inlet and the distal end provides an outlet;
   at least three contiguous reaction zones comprising a pyrolysis zone followed by an oxidation zone with a Kline-Fogelman step, followed by a reduction zone;
   at least two separate rings of pressurized plano air inlets, configured to deliver adjustable volumes and pressures of oxidant streams, located around the perimeter of the oxidation zone,
   wherein at least one of the at least two rings of plano air inlets is located at the Kline-Fogelman step, and
   further wherein the gasifier is a downdraft gasifier used for gasification of feedstock.

7. The gasifier of claim 6, the vertically positioned tubes further comprising an interior wall made of silica carbide, silica oxide, aluminum oxide, ceramic or a refractory alloy.

8. The gasifier of claim 6, further comprising a grate positioned below the reduction zone.

9. The gasifier of claim 6, further comprising at least one fill level indicator in the pyrolysis zone and an automatic feed mechanism that is activated when the at least one fill level indicator detects a low feedstock level.

10. The gasifier of claim 6, further comprising a pressure lock.

11. A gasifier comprising:
    a plurality of conjoined and vertically positioned tubes having a proximal end and a distal end, wherein the proximal end provides an inlet and the distal end provides an outlet;
    at least three contiguous reaction zones comprising a pyrolysis zone, followed by an oxidation zone with a dilated middle, followed by a reduction zone;
    at least two separate rings of pressurized piano air inlets, configured to deliver adjustable volumes and pressures of oxidant streams, located around the perimeter of the oxidation zone;
    a vertically adjustable bypass; and
    at least one biochar collection chute and a residue box under the bypass, the at least one biochar collection chute further comprising two or more producer gas vents,
    wherein the gasifier is a downdraft gasifier used for gasification of feedstock.

12. The gasifier of claim 11, the vertically positioned tubes further comprising an interior wall made of silica carbide, silica oxide, aluminum oxide, ceramic or a refractory alloy.

13. The gasifier of claim 11, further comprising at least one fill level indicator in the pyrolysis zone and an automatic feed mechanism that is activated when the at least one fill level indicator detects a low feedstock level.

14. The gasifier of claim 11, wherein at least one of the at least two rings of plano air inlets is located around the dilated middle.

15. The gasifier of claim 11, further comprising a pressure lock.

16. A gasifier comprising:
    A plurality of conjoined and vertically positioned tubes having a proximal end and a distal end, wherein the proximal end provides an inlet and the distal end provides an outlet;
    at least three contiguous reaction zones comprising a pyrolysis zone, followed by an oxidation zone, followed by a reduction zone;
    at least a higher ring and a lower ring of pressurized piano air inlets located around the perimeter of the oxidation zone;
    a grate positioned below the reduction zone; and
    at least one biochar collection chute and a residue box under the grate, the at least one biochar collection chute further comprising two or more producer gas vents,
    wherein the gasifier is a downdraft gasifier used for gasification of feedstock.

17. The gasifier of claim 16, the vertically positioned tubes further comprising an interior wall made of silica carbide, silica oxide, aluminum oxide, ceramic or a refractory alloy.

18. The gasifier of claim 16, further comprising at least one fill level indicator in the pyrolysis zone and an automatic feed mechanism that is activated when the at least one fill level indicator detects a low feedstock level.

19. The gasifier of claim 16, further comprising a pressure lock.

20. A gasifier comprising:
   A plurality of conjoined and vertically positioned tubes having a proximal end and a distal end, wherein the proximal end provides an inlet and the distal end provides an outlet;
   at least three contiguous reaction zones comprising a pyrolysis zone, followed by an oxidation zone, followed by a reduction zone;
   at least two separate rings of pressurized plano air inlets, configured to deliver adjustable volumes and pressures of oxidant streams, located around the perimeter of the oxidation zone;
   a grate;
   a pseudo-seal of biochar for the distal end of the gasifier on top of the grate; and
   at least one biochar collection chute and a residue box under the grate, the at least one biochar collection chute further comprising two or more producer gas vents, wherein the gasifier is a downdraft gasifier used for gasification of feedstock.

21. The gasifier of claim 20, wherein at least one of the at least two rings of piano air inlets is located around a dilated portion of the oxidation zone.

22. The gasifier of claim 20, the vertically positioned tubes further comprising an interior wall made of silica carbide, silica oxide, aluminum oxide, ceramic or a refractory alloy.

23. The gasifier of claim 20, further comprising at least one fill level indicator in the pyrolysis zone and an automatic feed mechanism that is activated when the at least one fill level indicator detects a low feedstock level.

24. The gasifier of claim 20, further comprising a pressure lock.

* * * * *